(12) United States Patent
Bakken

(10) Patent No.: US 12,316,436 B2
(45) Date of Patent: May 27, 2025

(54) BACKSCATTER COMMUNICATION SYSTEM

(71) Applicant: ONIO AS, Oslo (NO)

(72) Inventor: Vemund Bakken, Oslo (NO)

(73) Assignee: ONIO AS, Oslo (NO)

( * ) Notice: Subject to any disclaimer, the term of this patent is extended or adjusted under 35 U.S.C. 154(b) by 379 days.

(21) Appl. No.: 18/164,009

(22) Filed: Feb. 3, 2023

(65) Prior Publication Data

US 2024/0267118 A1 Aug. 8, 2024

(51) Int. Cl.
| | | |
|---|---|---|
| H04B 7/22 | (2006.01) | |
| H04B 5/00 | (2024.01) | |
| H04B 5/72 | (2024.01) | |
| H04L 5/00 | (2006.01) | |
| H04L 27/26 | (2006.01) | |
| H04L 27/34 | (2006.01) | |

(52) U.S. Cl.
CPC ................. H04B 7/22 (2013.01); H04B 5/72 (2024.01)

(58) Field of Classification Search
None
See application file for complete search history.

(56) References Cited

U.S. PATENT DOCUMENTS

| | | | | |
|---|---|---|---|---|
| 9,698,898 | B2 * | 7/2017 | Doetsch | H04B 7/2621 |
| 9,894,471 | B1 * | 2/2018 | Zalewski | H04W 76/10 |
| 10,652,073 | B2 * | 5/2020 | Talla | H04L 25/0278 |
| 10,951,446 | B2 * | 3/2021 | Kellogg | G01S 13/82 |
| 11,201,775 | B2 * | 12/2021 | Lopez | H04B 5/45 |
| 11,296,819 | B2 * | 4/2022 | Kim | H04L 1/0034 |
| 11,408,976 | B1 * | 8/2022 | Cohen | G01S 13/88 |
| 11,470,553 | B2 * | 10/2022 | Haque | H04W 76/28 |
| 11,483,836 | B2 * | 10/2022 | Zhang | H04W 72/0466 |

(Continued)

FOREIGN PATENT DOCUMENTS

WO 2017132400 A1 8/2017

OTHER PUBLICATIONS

Great Britain Intellectual Property Office; Combined Search and Examination Report under Sections 17 and 18(3) for Serial No. GB2301539.9; issued Aug. 1, 2023.

(Continued)

*Primary Examiner* — Tuan A Tran
(74) *Attorney, Agent, or Firm* — Flener IP & Business Law; Zareefa B. Flener

(57) ABSTRACT

Described herein is a backscatter enabled device comprising: a receiver for receiving a signal in a first frequency channel including a data payload modulated onto a carrier and a constant tone extension at least part of which comprises a constant tone; energy detection means for detecting energy in the signal and initiating wait logic when, following an initial detection of energy, no energy is detected during a time period; wherein the wait logic is configured to wait for a trigger indicating that the constant tone is being received and send a start signal at the trigger; signal modulation means for receiving the start signal and, in response, modulating the constant tone based on data to be sent to produce a backscatter signal; and a transmitter for transmitting the backscatter signal. Also described herein is a transmitting device for use in a communication system comprising at least one backscatter enabled device and a receiving device and a communication system.

18 Claims, 3 Drawing Sheets

(56) References Cited

U.S. PATENT DOCUMENTS

| | | | | |
|---|---|---|---|---|
| 11,620,462 B2* | 4/2023 | Sundaresan | ........ | G06K 7/10366 |
| | | | | 235/451 |
| 11,638,136 B2* | 4/2023 | Lopez | ................ | H04L 27/2042 |
| | | | | 342/367 |
| 11,722,347 B2* | 8/2023 | Rosenthal | ............ | H04L 5/0007 |
| | | | | 375/262 |
| 11,843,494 B2* | 12/2023 | Zhu | ........................ | H04B 5/45 |
| 11,888,608 B2* | 1/2024 | Wu | ........................ | H04L 1/00 |
| 11,985,012 B2* | 5/2024 | Sharma | ............ | H04L 25/03299 |
| 12,267,127 B2* | 4/2025 | Dunna | .................... | H04B 5/45 |
| 2016/0365890 A1 | 12/2016 | Reynolds et al. | | |
| 2018/0375703 A1* | 12/2018 | Kellogg | ................. | H04L 27/34 |
| 2019/0274144 A1* | 9/2019 | Zhang | ..................... | H04B 7/22 |
| 2021/0119726 A1* | 4/2021 | Kim | ......................... | G06N 3/08 |
| 2021/0368439 A1 | 11/2021 | Karimaruthumkal et al. | | |
| 2021/0377859 A1 | 12/2021 | Katan Baf Nezhad et al. | | |
| 2021/0378037 A1 | 12/2021 | Katan Baf Nezhad et al. | | |
| 2022/0224583 A1* | 7/2022 | Rosenthal | ............... | H04L 27/02 |
| 2023/0397017 A1* | 12/2023 | Elshafie | ................ | H04W 72/23 |

OTHER PUBLICATIONS

Norwegian Patent Office Search Report for Serial No. 20230106, dated May 24, 2023.
Norwegian Patent Office First Office action for Serial No. 20230106, dated Jun. 5, 2023.

* cited by examiner

BACKSCATTER COMMUNICATION SYSTEM

The present invention relates to a backscatter communication system, and in particular to a system for communication using backscatter techniques wherein a Constant Tone Extension (CTE) of a received data packet is modified and re-transmitted.

Backscatter communication uses carrier signals to send data. The carrier signals are produced externally to the transmitting unit, and are typically emitted by a dedicated unit within a communication system. The carrier signal is modified within the backscatter unit based on the data to be sent, and the data is retrieved by receiving and decoding the modified signal at a receiving unit. A typical backscatter communication system therefore comprises one or more backscatter units which are configured to modify a carrier signal and transmit the modified signal at a different frequency, one or more separate units for emitting the carrier signal towards the backscatter unit, and a receiving unit able to receive and decode the modified signal coming from the backscatter unit.

Devices communicating wirelessly typically initially send advertising packets on one of a number of specific advertising channels. These inform enabled devices in the vicinity of the presence of the transmitting device, and contain information which will allow a second device to connect. Once a pair request is received from the second device in response to the advertising packet, information is sent back and forth to allow the two devices to communicate. The transmissions between the two are coordinated both in terms of timing and the frequency channel used. In general, a signal carrying data is divided into a number of data packets to be sent within a particular channel or set of channels at different frequencies.

The data packets, including advertising packets, generally each include a preamble portion, which allows synchronization of the receiving and transmitting devices. The format of the data packets can be different for different standards and at different frequencies. In the case of a Bluetooth® data packet, and data packets of other standard communication protocols, the preamble is followed by a header with information about the payload, the payload itself, and a cyclic redundancy check (CRC) sequence, which allows the integrity of the data in the payload to be verified. The header includes a length field informing the receiving device of the length of the payload to follow. Fewer packet sections, or additional packet sections, may be included depending on whether the data is being sent via Bluetooth or another means such as Zigbee® or Wifi, and/or depending on the version type and how the communicating devices are set up in each case.

The article *"Inter-Technology Backscatter: Towards Internet Connectivity for Implanted Devices"* by Iyer et al. (DOI: http://dx.doi.org/10.1145/2934872.2934894) and WO-A-2017/132400 each describe use of modified Bluetooth advertising packets as carrier signals for backscatter communication. The backscatter device shifts the wavelength of the transmitted signal out of the Bluetooth range to allow compatibility with certain receivers in devices such as smartphones. In order to send data using backscatter techniques, a standard BLE advertising packet must first be modified to produce a single frequency signal. This is done by reversing a data whitening process applied to the payload portion of the advertising packet to force a Bluetooth device to emit a long series of a single bit type rather than the usual payload. This amounts to a single frequency carrier signal being emitted by an external device or "helper device" (i.e. either a long string of zeros or a long string of ones). The constant frequency signal emitted by the external device is then used as the carrier signal. This means that it is received by the backscatter device, and is modified to forward data to a third device. The payload of the packet received by the backscatter device therefore no longer represents data to be sent, but rather a single tone carrier signal.

Accurate identification of the start of this part of the signal is not possible, and a pause after detection of a start of the packet is used to try to ensure that the backscatter device modulates within the adapted payload. One major issue with this technique is that, if the wavelength of the backscattered signal is not shifted out of the Bluetooth range, receivers which are in range and which are configured to receive Bluetooth packets will already be synchronized according to the initial preamble of the packet sent by the transmitting device. If the modified data is not also exactly synchronized with the initial preamble it will not be readable by these devices.

Standard backscatter techniques, including those configured to use signals in the Bluetooth range as the carrier, often require specialized units within the communication system to produce a carrier wave, which adds cost and complexity. The Iyer et al. system requires a modification of standard Bluetooth devices in order to force the data whitening electronics of the device to produce a single tone signal which replaces the payload of a data packet. Aside from the fact that additional modifications to the Bluetooth enabled devices are required, signals are emitted in the Bluetooth advertising channels with a payload that contains no data. This could potentially cause issues for other Bluetooth enabled devices nearby or within the same system, which are configured to receive and decode such signals. Improvements to this type of backscatter system are desired.

According to a first aspect of the present invention, there is provided a backscatter enabled device comprising: a receiver for receiving a signal in a first frequency channel including a data payload modulated onto a carrier and a constant tone extension at least part of which comprises a constant tone; energy detection means for detecting energy in the signal and initiating wait logic when, following an initial detection of energy, no energy is detected during a time period; wherein the wait logic is configured to wait for a trigger indicating that the constant tone is being received and send a start signal at the trigger; signal modulation means for receiving the start signal and, in response, modulating the constant tone based on data to be sent to produce a backscatter signal; and a transmitter for transmitting the backscatter signal.

The backscatter device is not therefore required to decode and read the signal, which means that the device is able to operate at very low levels of power. Use of a CTE following a period of no energy in the signal for modulation means that the rest of the data packet, including the payload, can still be received by other traditional devices in the vicinity and read as a normal data packet in the usual way. The backscatter system does not interfere with the operation of a larger traditional network of devices of which it forms a part.

The portion of the data packet received immediately prior to the start of the constant tone extension may be a guard interval during which no energy is present in the signal. The energy detection means of the backscatter device is set up to receive the incoming signal as input and to determine whether or not there is power in the signal. The energy detection means is able to determine that a signal is being received via an initial rise in energy level, to continue to receive the incoming signal as input, and by doing so to detect when the signal has transitioned from the part of the signal carrying payload data or the CRC, and into the guard interval. There may be a period between the initial detection of energy in the signal and detection of the guard interval during which the energy detection means is sent into sleep mode, but in such a case it will be active for the initial detection of energy and will be activated again to receive the still incoming signal as input and detect the start of the guard interval. The time period may be between 4 us and 16 us in duration, preferably between 6 us and 10 µs, most preferably 8 µs.

In embodiments, the modulated signal is transmitted in the first frequency channel.

In embodiments, the data packet is Bluetooth Low Energy compliant.

In embodiments, the trigger is the subsequent detection of energy in the signal by the energy detection means.

In embodiments, the trigger is the subsequent detection of a specific pattern in the signal by the energy detection means.

In embodiments, the trigger is the passage of a predetermined time interval since the wait logic was initiated.

In embodiments, the specific pattern is a constant power in the signal having a duration longer than one bit-period.

In embodiments, the specific pattern is an address sequence included at the start of the constant tone extension immediately preceding the constant tone. The address sequence can comprise periods of power and periods of no power in the signal.

The energy detection means provides information that allows the start of the constant tone portion to be identified. This may be by identifying the start of the guard interval and then waiting a fixed length of time or by identifying a difference between the guard interval and the CTE. This can mean continuing to use the energy detection means to detect a second energy peak at the start of the CTE, or detecting the end of a particular address sequence/pattern for which no power in the signal represents a first value and power in the signal represents a second value. The address sequence can be included at the start of the CTE and prior to the constant tone itself. Once the guard interval is identified, therefore, the position of the start of the constant tone portion of the CTE can be detected or inferred in a simple manner.

In embodiments, the backscatter enabled device is configured to read the address sequence and either terminate the process or modulate the constant tone based on the data in dependence on the address sequence read.

In embodiments, the energy detection means is a power detector having an input and at least two outputs indicating power in the incoming signal and no power in the incoming signal respectively. This provides a very simple and low power mechanism by which to distinguish between different sending devices.

In embodiments, the power detector is configured to sample the signal periodically and provide an output. The output may indicate power or no power in the signal. The frequency of the sampling can be at least 1 per bit period, and preferably at least 2 per bit period. This will represent a sampling frequency of at least $1\ \mu s^{-1}$ or at least $2\ \mu s^{-1}$ for a bit period of 1 µs.

In embodiments, the backscatter enabled device comprises a comparator circuit having an input and at least three outputs indicating power in the incoming signal above a threshold, no power in the incoming signal, and power in the incoming signal between an upper and a lower threshold. No power in the signal may be represented by a power in the signal falling below a lower threshold. To achieve two outputs, the comparator circuit may include one comparator for comparing an output from a power detector with a threshold (above=power in the signal, below=no power in the signal). To achieve three outputs, the comparator circuit can include two comparators.

In embodiments, the backscatter enabled device is configured to switch the energy detection means into sleep mode after the initial detection of energy and to switch it on again a predetermined length of time later. This further improves power saving capabilities.

In embodiments, the predetermined time is less than the estimated time between the start of the packet and the start of a guard interval preceding the constant tone extension during which there is no power in the signal.

In embodiments, the backscatter enabled device comprises a switch module, and the data to be sent comprises data representing an ambient light level sensed by the switch module and a current position of the switch. The switch module may be a dimmer switch module. The switch module may comprise a power source, which may be a photovoltaic cell. In embodiments, the data representing an ambient light level comprises a rate of energy collection by the photovoltaic cell.

According to a second aspect of the present invention, there is provided a method for operating a backscatter enabled device comprising: receiving a signal in a first frequency channel including a data payload modulated onto a carrier and a constant tone extension at least part of which comprises a constant tone; parsing the signal and initiating wait logic when, following an initial detection of energy, no energy is detected during a time period; waiting, by the wait logic, for a trigger indicating that the constant tone is being parsed and sending a start signal at the trigger; receiving, by signal modulation means, the start signal and, in response, modulating the constant tone based on data to be sent; and transmitting the modulated signal.

According to a third aspect of the present invention, there is provided a transmitting device for use in a communication system comprising at least one backscatter enabled device and a receiving device, the transmitting device being configured to: modify a data packet such that it comprises a data payload modulated onto a carrier preceding a constant tone extension at least part of which comprises a constant tone, and such that the data packet includes instructions to the receiving device to exit synchronised mode and to prepare for re-synchronisation after receipt of the payload and prior to the start of the constant tone extension. This allows for the use of packets with a format already including a CTE with minimal modification to the transmitted data required.

In embodiments, the transmitting device is configured to modify the data packet to include an address sequence at the start of the constant tone extension, preceding the constant tone portion.

In embodiments, the address sequence comprises a series of bits, wherein a time interval with power in the signal represents a first bit value and a time interval with no power in the signal represents a second bit value.

In embodiments, the transmitting device is configured to modify the data packet to include a guard interval during which no signal is sent immediately prior to the constant tone extension.

According to a fourth aspect of the present invention, there is provided a communication system comprising: the backscatter enabled device of the first aspect; and a second device comprising a transmitting device for transmitting the signal towards the backscatter device.

In embodiments, the transmitting device is the transmitting device of the third aspect.

In embodiments, the energy detection means comprises an input for receiving the signal, and at least two outputs, one indicating that power is present in the signal and one indicating that no power is present in the signal. If an address sequence is included at the start of the CTE, the output of the energy detection means will be different depending on the address sequence being input, and can therefore be used to identify the sending device or provide other information to the system. The address sequence may comprise a period of time during which the signal alternates between power and no power to represent two values, as mentioned above.

The receiver and transmitter of the backscatter device may be the same (a transceiver used for receiving and transmitting data).

In embodiments, the received signal complies with a standard protocol, such as BT (Bluetooth), BTLE, RFID, Zigbee, wifi, GSM, other wireless protocols, etc.

In embodiments, the backscatter enabled device comprises a sensor and the data to be sent comprises or is derived from the sensor readings.

In embodiments, the backscatter enabled device comprises a remote control with a user interface, the second device comprises an electronic device to be controlled by the remote control, and the data to be sent comprises control data input by a user using the user interface of the remote control.

In embodiments, the received signal comprises a data packet and the constant tone extension follows both the data payload and a subsequent guard interval in the data packet.

Embodiments of the present invention will now be described, by way of example only, with reference to the following figures wherein.

Figure 1:
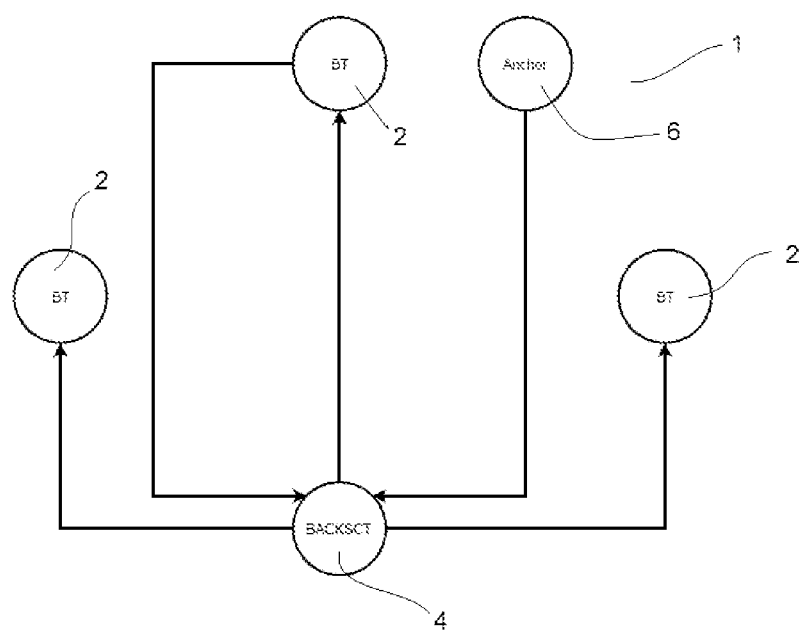
FIG. 1 illustrates a communication system including Bluetooth enabled devices and a backscatter enabled device.

A communications network 1 is shown in FIG. 1, including a backscatter enabled device 4. One backscatter enabled device is included in the network of FIG. 1, but there may be a plurality of these devices present. The backscatter enabled devices each comprise either a separate transmitter and receiver or a combined transceiver for receiving and sending data in one or more wavelength bands or frequency channels. Each backscatter enabled device may be configured to receive and/or transmit data in the Bluetooth or Bluetooth Low Energy wavelength bands or in frequency bands corresponding to another technology (such as RFID and Zigbee, wifi, GSM, etc). The transmitter and receiver may be configured to operate in the same wavelength band. The system will most often also include additional devices 2 which are not backscatter enabled. These additional devices can be configured for receipt and transmission of data packets in the same frequency bands as the backscatter device(s), and may be phones, laptops, watches, televisions, or any other standard device. One or more of these devices may be Bluetooth enabled, as shown in FIG. 1. A major advantage of the system described herein is that it can work within this type of network, including standard devices which are themselves sending and receiving data in the same wavelength bands as the backscatter device, without interfering with the performance of the communications network, and requiring minimal or no modification of these additional devices. The network can optionally include an anchor unit 6, which is dedicated to producing a constant tone signal, and which can be used for backscattering in addition to signals from the standard devices 2. FIG. 1 illustrates a network configured for backscattering of Bluetooth signals, but other wavelengths are of course possible.

The backscatter enabled devices require very little power in order to operate, but use incoming data packets which are modulated and returned in order to send data, as will be described in detail below. The devices use energy detection means to locate the constant tone within a constant tone extension at the end of the data packet, and it is this constant tone which is modulated and resent. Backscatter enabled devices can be associated with energy harvesting means to provide them with the low level of power required to operate. The energy harvesting means and backscatter enabled devices can be coupled to the same object, which may be a wearable or a lightweight portable object.

Generally, communications protocols require that a connection or communication link is initiated with another device in the network. Setting up a connection comprises reaching, in some way, a mutual agreement as to which frequency signals will be sent and received on. The connection may also require an agreement as to the timing of the packets to be sent. This can be achieved using any means, including NFC or standard protocol associated with a pairing process. One or more of the communicating devices can also be pre-programmed to communicate on a particular channel, in which case data can be sent and received by devices operating on the same channel(s). The timings of the communications will depend on when and what proportion of the time the receiving device is configured to send data and when the receiving device is listening for that data.

Figure 2:
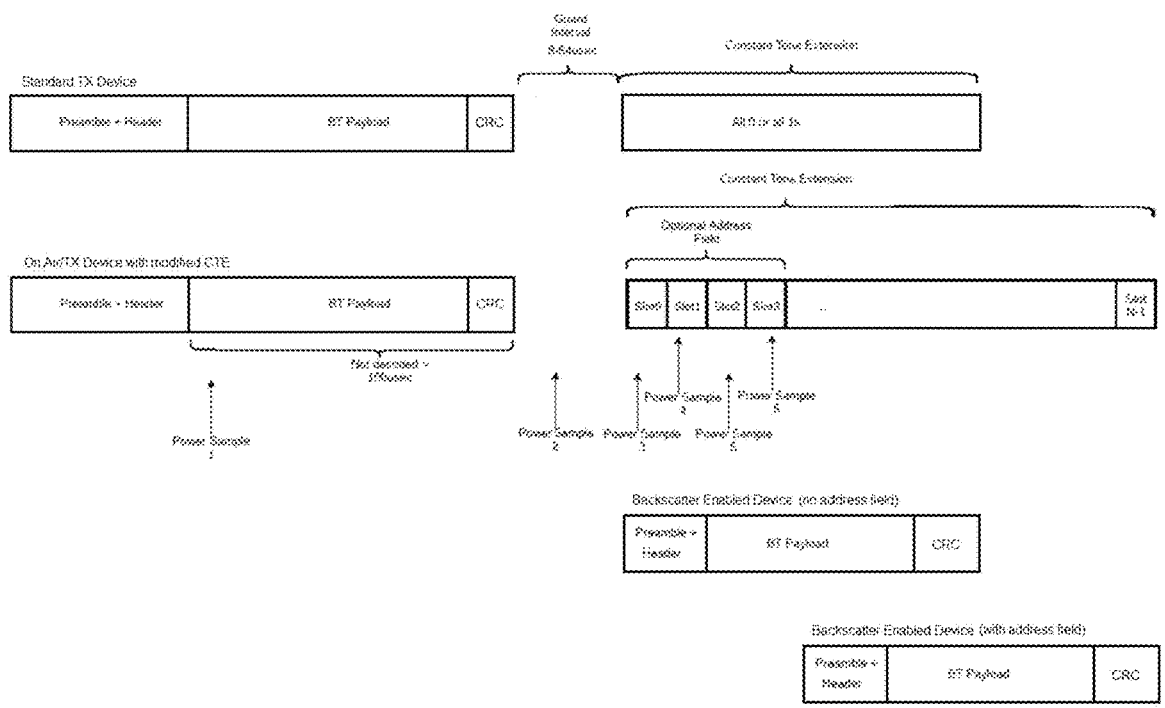
FIG. 2 shows the structure of a data packet as sent by transmitting devices in a network and backscatter enabled devices.

Conventional Bluetooth devices operate in this way to send and receive data. To do so they require the packets sent to follow a particular standard format. The format of a standard Bluetooth packet is illustrated in FIG. 2 (emitted by the transmitting device or 'Standard TX Device' which can be a standard Bluetooth device). The data packet includes a brief "preamble" which comprises a series of bits, alternating with each bit (i.e., following the pattern 10101010 or 01010101). This is used by a receiving device to synchronise with the transmitting device, i.e. to transition into synchronised mode for a time, in order to be able to receive and decode the payload data which follows. The preamble is followed by a header including a length field which tells the receiving device how long the remainder of the data packet will be, i.e., how long the receiver should remain in synchronised mode for. After the header comes the data payload itself, and then a CRC check to verify the integrity of the payload data. All Bluetooth data packets follow the above format, including advertising packets which are sent out in one of three specific frequency channels in order to inform receiving devices of the presence of a transmitting device. Receiving devices which are Bluetooth enabled can follow pairing protocol to set up a connection for communication with the transmitting device in response to receipt of the advertising packet. Newer Bluetooth standards also include short guard interval after the CRC check, as shown in FIG. 2, followed by a constant tone extension (CTE) comprising a length of the signal at a constant frequency (constant tone). This constant tone extension is intended for use in range finding. The same process can work with any communication standard, and will be best suited to those where standard data packets already include a guard interval and constant tone extension. Although the figures illustrate Bluetooth packets and Bluetooth enabled devices within a network, use of the backscatter enabled devices in a system of Zigbee or wifi enabled devices would also be a good option, for example. In such a case the backscatter enabled devices would be set up to receive and modulate signals in the respective wavelength range in the same way as is described for Bluetooth networks herein.

In some cases, the energy detection means of the backscatter enabled device can be configured to detect energy in a particular wavelength band, such as in one or more of the Bluetooth advertising channels. The device will then, in principle, backscatter the signal whenever a data packet in that wavelength band is received from another device. This can be of benefit in some cases, but may reduce privacy and control to an extent. A short address sequence can be included at the start of the constant tone extension in data packets sent by transmitting devices within the network, and this can be used by the backscatter enabled devices in order to identify which received data packets should be backscattered and which should not. The backscatter device may backscatter only signals with a particular address sequence, or with an address sequence at all, for example, or may respond in a particular way depending on the address sequence received. The address sequence, which is shown in FIG. 2 as part of the signal transmitted by a TX device with modified CTE, can identify a sending device and/or a type of data to be sent back via backscatter. This way, only a subset of the advertising packets received by a particular backscatter enabled device will be backscattered. Others will be ignored, but can still be received by other Bluetooth enabled devices in the vicinity and dealt with as a data packet (such as an advertising packet) in the normal way.

As mentioned above, the backscatter enabled device comprises a signal modulation means which is operable to modify the constant tone part of the constant tone extension in the incoming data packet. The data packet sent by the backscatter enabled device is shown in FIG. 2. This is shown in a case where a standard data packet (no address field) is modified. Below this, the packet sent by a backscatter device receiving an incoming packet with the additional address field is illustrated (with address field). If an address field is included in the received signal, the backscatter enabled device will begin transmitting later, after the address field has been received. The CTE where an address field is shown is illustrated in FIG. 2 as being of longer duration that a standard CTE, but this is not necessarily the case.

Figure 3:
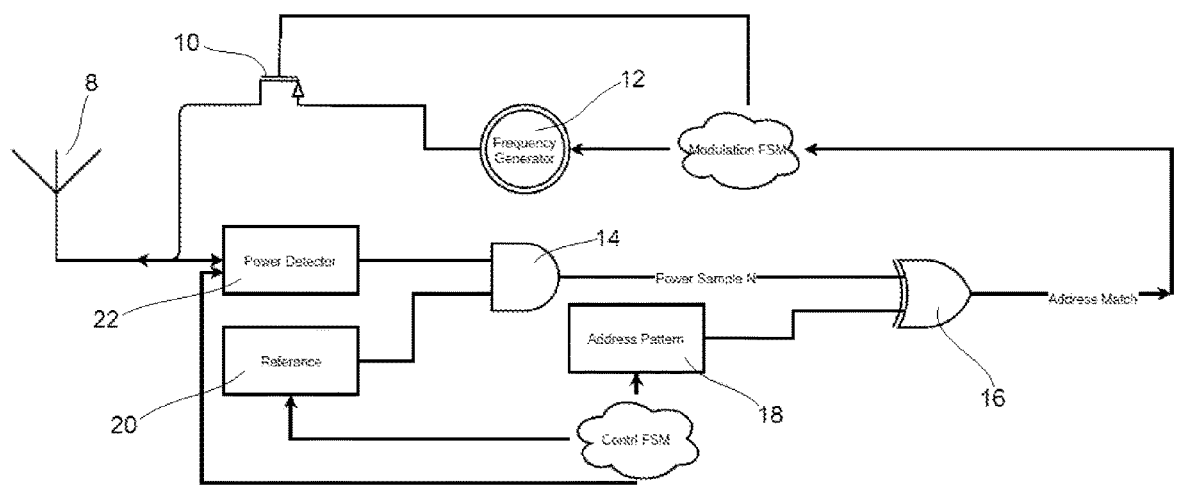
FIG. 3 illustrates a backscatter enabled device in more detail.

Standard signal modulation means can be used for the purpose of modifying the signal. The modification of the constant tone for transmission by the backscatter device can comprise a frequency modulation of the constant tone. The frequency modulation can be carried out using a modulation controller, frequency generator 12, and a modulation switch 10 to encode a sequence of bits for transmission via antenna 8 as shown in FIG. 3, for example. The antenna 8 may be configured as a transceiver for both receiving the incoming signal and transmitting the modulated signal, or a separate receiver and transmitter can be provided.

The constant tone portion of the signal may comprise a part of or all of a standard CTE, such as the CTE of a Bluetooth signal. A CTE was introduced with Bluetooth version 5.1 in 2019, appended to the end of the BLE packet, and following a short guard interval during which the signal contains no energy (a short pause in the signal). The intention behind this adaption to the signal format was to enable accurate direction finding, which could pinpoint the source of a signal much more precisely than previous methods which used estimates of attenuation. An angle of arrival can be estimated using a phase difference between a signal received at multiple antennas within the receiving device. The use of this method, however, requires a constant amplitude and constant frequency signal, which led to the introduction of the CTE into the Bluetooth standard. The BLE CTE included in at least Bluetooth version 5.1 is an example of a suitable signal format for use in the present system. The payload in this type of signal includes a modification which informs a receiving device that it should remain in synchronised mode for longer than indicated in the initial length field, i.e. long enough to receive the CTE as well as the payload.

If no CTE forms part of the standard data packet being sent and received by devices in the network, transmitting devices can be configured to add a guard interval and a CTE onto to the end of the data packet prior to transmission. In such a case, the rest of the data packet will not need modification. Normal devices receiving the transmitted signal will switch out of synchronised mode at the end of the standard data packet and before the appended constant tone extension. This results from the fact that the length field is unchanged and no additional information is included in the payload relating to any CTE. The receiving device will then be prepared to receive another data packet and to use the preamble of this data packet for synchronization. This will improve performance of the network by allowing receiving devices to re-synchronise with the backscattered signal. Standard data packets already including a CTE can be modified at the transmitting device to instruct receiving devices to switch out of receiving mode after the data payload and before the CTE. The modification may include removing information relating to the CTE from the payload, and/or specifying within the data packet, and possibly within the payload, that the CTE is to be used for backscatter and that any receiver should exit synchronised mode at the end of the CRC.

Because a data packet includes additional portions (such as the usual preamble, header, and data payload), it is useful for the start of the constant tone extension to be detected accurately enough so that only the constant tone portion of the CTE is modified and the data can be retrieved easily from the backscattered signal by a communicating device. This can be achieved using the energy detection means. The energy detection means is configured to receive the incoming data signal as input and provide output which can assist logic of the device with accurately detecting the start of the constant tone portion of the signal. Once the start of the constant tone portion is identified, a start signal is sent to the signal modulation means to cause it to begin modification of the signal for re-transmission. The modification may comprise frequency modulation of the constant tone to represent a series of data bits to be sent, and the modified signal may have the same format as the transmitted signal (including a preamble, header, payload, and CRC). The modified signal may also be sent in the same frequency channel as the originally transmitted signals. Receiving devices in the network can therefore be set up to receive and process both the transmitted data packets and the backscattered data packets in the same manner.

The energy detection means, and other parts of a backscatter enabled device, are shown in FIG. 3. The energy detection means will usually comprise a sampler or power detector 22 including an input for receiving the incoming signal via an antenna 8, and at least two possible output values, high and low. The output value will be high if power is present in the signal input to the detector and low if not. In one configuration, the power detector 22 can include a capacitor circuit with a switch, and a clock for switching the circuit. This configuration of components measures the power in the signal by allowing charge to accumulate on the capacitor during a time period when the switch is open, and then emptying the capacitor while the switch is closed. The amount of charge accumulated during the time period will depend on the power in the incoming signal input to the diode. The clock cycle can be set as desired. Preferably the clock period is fairly long, so as to minimise power usage of the circuit. The power detector may also include a diode.

The output of the power detector is fed to a comparator circuit 14 comprising at least one comparator, and is compared to an input reference voltage 20. If the voltage input from the power detector is below the reference voltage the output of the comparator is low (value 0), and if the voltage input is at or above the reference voltage the output of the comparator is high (value 1). A sequence of bits in the incoming signal (i.e., the payload) will be represented as a long period of power in the signal, as illustrated in the graph showing power in a data packet over time at the bottom of FIG. 2 (which corresponds to the signal sent by the TX device with modified CTE). The guard interval will be represented as a period of no power, and the address sequence (if present) will be represented by alternating periods of power and no power, depending on the sequence itself. The address sequence in FIG. 2 can be represented as a series of bits, in this case 1001 (power in slot 0, no power in slots 1 and 2, and power in slot 3). In this example, the signal in slots 4 to N−1 is a constant tone. Four bits as the address sequence provides a good balance between number of different sequences available and the length of the address sequence required, since a longer address sequence will mean that less of the original CTE is available for modification. The length of the address sequence (number of bits and/or duration) can however be modified depending on need. An ADC can be used as an alternative to the comparator, but this will result in a higher power usage for the system.

One or more additional comparators can be included as part of the comparator circuit 14, and the output from the power detector 22 can be provided as input also to the additional comparators. If two comparators are used, one can be configured to compare an input with a higher reference voltage, and the other can be set up to compare the same input with a lower reference voltage. The outputs from the two comparators will then be able to distinguish between a power detector output that is above the higher threshold (full power in signal), that is between the two thresholds (lower power, such as half power, in signal), and that is below the lower threshold (no power in signal). This configuration increases the possible number of address sequences which can be used at the start of the CTE, keeping the CTE short and the number of devices that can be supported high.

The output of the comparator circuit is then fed to a correlator 16 (which may be represented by a simple XOR gate or similar), and this correlator compares the output of the comparator circuit with a specific address pattern 18 or with a set of different patterns. When a match is found, a start signal is sent to the signal modulation means to begin modulation of the signal and transmission of the modulated signal. A plurality of correlators can be included, one for comparison with each possible address pattern. More than one address pattern can trigger modulation for the backscatter device, or different address patterns can result in different data being used for the modulation. Preferably, the address sequence begins with a '1', i.e. a period of power in the signal, which allows it to be distinguished from the guard interval by the energy detector which is operating. If the address sequence is permitted to include a '0' as the first bit, then the timing of the start of the address sequence will need to more precisely known, which might mean turning the energy detector on earlier in order to also detect the end of the data packet. Otherwise, the energy peak at the start of the sequence can provide the necessary information or accuracy.

FIG. 2 illustrates some possible different sampling points in the signal, and includes a graph showing the power in the signal at each sampling point for the signal from the TX device with modified CTE including an address field/sequence. The output of the sampler will reflect the power detected in the signal at each sampling point for different portions of the incoming data packet. The data packet can include a short address sequence at the start of the CTE, is shown in FIG. 2 as transmitted by the "TX device with modified CTE", although this is not necessarily always the case. The constant tone portion may begin immediately after the end of the guard interval in some cases, as in the case of the signal emitted by the "standard TX device", and may last the entire length of the CTE. Where an address sequence is present, the output of the sampler reflects high power in the incoming signal during the bulk of the data packet, zero power during the guard interval, and alternating intervals of max power/no power during the address sequence. If a third output option is also utilized, the output of the sampler will also include sampling periods where half power is detected. The sampling rate can be adjusted to match the expected packet format (i.e., at least one power sample per bit of an address sequence) and the sampling rate can either be constant or can vary over the course of a packet.

Patterns to be matched will each comprise a particular sequence of either alternating max power/no power or a series of periods of one of max power, half power, or no power, each representing one possible address sequence. A match will therefore indicate that the guard interval, followed by a pattern representing a specific address sequence, has been received. All possible address sequences will be represented by a pattern within the set to be matched. If a match is found, and this corresponds to the ID of the backscatter device, then a start signal will be sent to the signal modulation means to begin modulation and transmission of the backscatter signal. This may be substantially immediately following the determination of a match. When the start of the initial period of no energy in the signal is detected (the guard interval), the energy detection means can send an indication to wait logic of the device, which will then transition into wait mode and await a trigger indicating that the constant tone portion of the CTE is being received. The start signal will be sent to the signal modulation means at the trigger. The trigger can be represented by a predetermined event or sequence of events occurring while the device logic is in wait mode. Events may be the detection of power in the signal by the energy detection means or the passage of a certain predetermined length of time after the logic is switched into wait mode. The trigger can also represent a match to one of the set of patterns being found by the correlator. These methods do not require decoding of the data payload of an incoming signal in order to perform a backscatter operation, which is an advantage in terms of power usage.

The modified data sent out by the backscatter device may be of the same format as the received signal minus the additional guard interval and CTE, as shown in FIG. 2. The signal transmitted by the backscatter device will thus generally also include a preamble for synchronisation, a header including a length field, a data payload, and a CRC (depending on the signal format used). The backscattered signal may be in the same frequency channel as the received signal, and will therefore be readable by the transmitting device and other devices in the vicinity which are configured to send and receive in the wavelength range at issue.

Backscatter devices can therefore operate within a larger network of devices which are transmitting and receiving signals in the wavelength range at which the backscatter device functions, and this can be done without interfering in communications between other devices in the network. This operation can be improved further by configuring transmitting devices to modify outgoing data packets, as mentioned above to include an address sequence and/or a CTE, or to include an instruction to receiving devices to switch out of synchronised mode before the start of a CTE already present.

As mentioned briefly above, traditional data packets with constant tone extensions include information in the data payload which informs a receiving device of the presence of the CTE, and causes the receiving device to stay in synchronised mode longer than it otherwise would have done in order to receive the CTE for use in range finding. Data packets without a CTE will rely on the length field in the header and will exit synchronised mode immediately after the CRC which follows the data payload portion of the signal. At this point the receiving device is ready to receive another preamble and synchronise to read a new data packet. A transmitting device can easily be configured to produce signals which include features of both of the above traditional data packets, and which still follow the correct format for receipt within the network. If transmitting devices within the network send data packets which do include the guard interval and the CTE, but which do not include the additional information in the payload instructing a receiving device to continue in synchronised mode after the CRC, then receiving devices will exit synchronised mode and will be ready to receive a new preamble after this point. When the constant tone portion of the CTE is backscattered, receiving devices will therefore have switched out of synchronised mode. This enables listening devices to synchronise using the preamble sent out as part of the backscattered signal, which reduces the required accuracy of the detection of the start of the constant tone portion of the received signal by the backscatter device as compared to a situation where the receiving device is already synchronised with the transmitted signal and is still in synchronised mode when the backscattered signal is sent.

Transmitting devices within the network can therefore be configured to send data packets which do include a constant tone extension and a guard interval, but which include instructions to a receiving device to switch out of synchronised mode when the end of the payload, and any subsequent CRC, has been reached. These instructions may comprise a length field in the header of the data packet which indicates that the end of the data packet coincides with the end of the payload/CRC and a payload which does not include additional information informing of the presence of the CTE. For a data packet not including a CTE, the guard interval and CTE can simply be appended by the transmitting device.

The energy detection means itself can be controlled to be switched on and off at certain times in order to minimize power usage. Generally, it is desirable that the energy detection means is switched on a short time before the expected start of the guard interval in order that this can be properly detected. This can be achieved using knowledge about the length of various standard portions of the received signal. Most data packets will include a preamble near to or at the start of the packet, as mentioned. The preamble can be fairly easily detected using, as described above, a simple power detector set up to detect a spike in power representing the start of the data packet. Detection of the preamble is a simple and accurate way to identify which part of the signal is being input to the energy detection means.

After detection of the preamble, the energy detection means operates to detect a subsequent period with no energy in the signal. In order to save power, the energy detection means can be switched off after detection of the preamble and switched on again a short time later. The energy detection means thus remains in sleep mode for a predetermined time period, the length of which will depend on the type of data packet being received, and is switched on again a short time before the expected start of the guard interval. For a Bluetooth data packet, the guard interval during which no signal is sent precedes the CTE, and this can provide a useful aid for operation of the energy detection means. Switch-on of the energy detection means is scheduled to be within the payload/CRC and just prior to the guard interval, which makes subsequent detection of the start of the guard interval particularly simple and very power efficient. For typical Bluetooth packets, the energy detection means is switched off for more than 15 µs, such as between 16 us and 400 µs, and preferably for around 80 us after the start of the preamble is detected, although this will depend on the length of the payload. No detection therefore occurs while the bulk of the data payload is being received.

Once switched on again, the energy detection means can detect the start of the guard interval, and then can detect or infer the start of the subsequent constant tone of the CTE in one of a number of ways. In one example, the energy detection means detects the start of the constant tone as the next time after switch on that a signal of constant power is received with a time period longer than one bit-period. A bit-period is the time taken to send a single bit of data. A common length for a bit-period is 1 µs. If a power detector of the type described above is used as the energy detector, then in one example the end of the guard interval will be detected if a positive or negative power of a constant level is parsed with a duration of more than one bit-period (in most cases 1 bit-period will be 1 µs, so the duration will be more than 1 us and can be up to 70 us depending on the length of the CTE).

Using this method, the constant tone extension cannot be confused with the guard interval, during which the signal has no power or with the preamble. This method is simplest, but does not account for the addition of a short address sequence at the start of the CTE. A preferred trigger is for the correlator to return a match to one of the set of address sequence patterns. This means that the end of the address sequence of the CTE has been reached, and the constant tone has started. The same detection means can be used to detect the start of the preamble and the start of the guard interval and subsequent constant tone extension, and can be sent into sleep mode in between the two detections to save power as described above. This will also help to avoid an incorrect detection of a constant tone within the data payload portion of the signal.

The constant tone extension is typically around 64 us to 160 us long for a Bluetooth data packet, which corresponds to around 16 to 160 bits. If an address sequence is included, this may be between 8 us and 40 us in length. This leaves at least around 120 us of the constant frequency portion of the signal which can be used to send data in the case of a 160-bit CTE, which would mean that 120 bits of data can be sent for a typical data packet.

Since the constant tone extension of a signal is generally fairly easily configurable by a user of a transmitting device to include an address sequence, the backscatter apparatus described above can allow for simple means by which to discriminate between different transmitting devices. The backscatter device may only backscatter signals from particular devices. This, along with the fact that all other portions of the data packet, including the data payload, remain unchanged, facilitates use of the device within a large network or within a room or building in which many Bluetooth enabled devices are operating. The data payload can still be transmitted and read by standard Bluetooth devices, with a modified CTE providing additional information to backscatter enabled devices within the group. The length of the address sequence can obviously be adapted as needed, but should take up only a small proportion of the CTE, leaving the rest free for data transmission. Any device can be configured to include an address sequence at the start of the CTE in a transmitted data packet. A receiving backscatter device will then recognise the address sequence, such as by matching to a particular pattern in the correlator, and can respond accordingly. This can be, for example, by terminating the process or by modulating the rest of the CTE with particular data and returning this to the sending device.

The backscatter enabled device may only backscatter the received signal in the event that the address sequence sent as part of the data packet CTE corresponds to an ID of the backscatter enabled device itself. Transmitting devices within the network can be configured to include different, unique, address sequences in the packets that they send out. This way even if a number of devices send out data packets simultaneously, only one of these data packets will result in a backscattered signal, which can help to avoid interference within the network. The transmitting devices can be configured with a random address sequence. An example of a suitable address sequence is a series of intervals during which the signal alternates between power and no power. This means that the energy detection means, which itself has a simple configuration and low power consumption, can be used to recognise the address sequence. If the option of a half or intermediate power signal is included, the sequence can alternate between max power, intermediate power, and no power. The backscatter device can be set up to recognise the first 8 to 40 bits of the CTE as an address sequence, and then to send a start signal to the modulation means to begin modulation of the constant tone portion which immediately follows the address sequence. Obviously, the particular length of the address sequence can be adapted depending on the requirements of the network, provided that transmitting devices and backscatter devices within the network are configured to operate for the same length of sequence. The correlator should be configured with a set of patterns representing a guard interval and then each of the possible address sequences to be used within the network by the transmitting devices.

The address sequence can in some cases act as a request for a particular type of information. The additional use of an address sequence will be of special value in a system including one or more backscatter devices or other devices equipped with different sensors, or devices capable of sending different information. The backscatter device can be mounted on a wall within a room and fitted with a thermometer and humidity sensor, for example, or can be included in a wearable device with biometric sensors. In order to receive information regarding temperature, a first address sequence can be included as an initial part of the CTE of a data packet transmitted by a transmitting/requesting device. The backscatter device then recognises the address sequence, or part of the address sequence, and responds by modulating the rest of the CTE to include temperature data and transmitting the modulated signal back to the sending device. To retrieve humidity data a different address sequence can be used. Devices without backscatter capability can also communicate with one another via the backscatter enabled device using address sequences included as an initial part of the CTE. Obviously, the type of data to be sent in response to different address sequences being detected can be adapted depending on how the network of devices is to be used. The address sequence can include both information regarding the identity of the transmitting device and information regarding a data type to be backscattered.

The address sequences can be individual to particular devices or groups of devices in the network, as mentioned. In order to avoid duplication of the sequences in networks made up of a large number of similar devices, the sequences can be randomized and/or alternated periodically. The combination of randomized address sequences and use of a "rolling address" where the address sequences of each transmitting device switch periodically is especially beneficial. This is because confusion between two devices can only then occur if the devices use the same random sequences and switch at the same time, which is extremely unlikely to occur in any network of realistic size. All transmitting devices can be set up to change address sequence for transmitted packets periodically, and can be synchronised so that address sequences for all of the transmitting devices in the network change together. This can be achieved via internal clocks and changing address sequence every time a fixed time period has passed or by using an external signal sent to all of the transmitting devices in response to which the address sequence for the device is shifted.

Once it established that the address sequence corresponds to the backscatter enabled device receiving the signal, packets received by the backscatter enabled device are modified based on data to be sent. The modified packets are transmitted onwards where they can be received by the transmitting device, which is set up to communicate in the same frequency channel, with other receiving devices in the vicinity, or both. The signal transmitted may therefore represent a request for data to be returned to the transmitting device by the backscatter enabled device, a request for a specific type of data to be returned to the transmitting device, or a request for data to be forwarded to one or more other devices within the network.

The above system is operable with any one or more standard devices configured to emit advertising and/or data packets including a CTE portion, however the system is particularly suitable for use with Bluetooth enabled devices using Bluetooth version 5.1 or higher, where the CTE is already part of the standard packet. The system will include an additional backscatter-enabled device comprising the energy detection means, and operable to modulate the constant tone portion of the CTE of the received data packet to send data.

The backscatter enabled device may be configured to modulate signals to send data from a sensor or similar also associated with the device. The sensor may provide information relating to its immediate environment (temperature, pressure, gas concentration, noise detection, and so on). The backscatter enabled device may be configured to be worn by a person or an animal, and the sensor may provide data relating to bodily functions, such as a skin or body temperature, EEG, ECG, heart rate, blood oxygen level, and the like. Whenever a signal within the correct wavelength range(s) is received from a device in the vicinity, and if applicable the address sequence is correct, the backscatter enabled device will identify the constant tone portion of the signal and modulate this portion in order to send the desired data. The communicating device may be any electronic device configured to send data packets including a constant tone extension or constant tone portion, such as a device operating using later versions of the Bluetooth protocol.

One example of a suitable use of the backscatter system described above is within a lighting system including a smart switch module, such as a dimmer switch module. The switch will include a toggle, slider, or knob which can be operated to control the brightness of at least one light source which is in communication with the switch directly or indirectly. Power can be provided to the switch for its operation using energy harvesting means, such as one or more photovoltaic cells, instead of or in additional to battery or mains power. Communication between the switch and the light source(s) can be wireless, and can be via a light control module which operates as a transmitting device, while the switch module operates as a backscatter enabled device. The light control module then controls the operation of the light source in response to information received from the switch module.

If a photovoltaic cell is used as the energy harvesting source, the rate at which energy being collected will give an indication of the intensity of daylight in the room or area being lit. Whether a photovoltaic cell or another power source is used, a sensor can be provided as an alternative to monitor an ambient light level. This information can be sent to the light control module along with information about the current position/configuration of the switch by the switch module. During operation of the system, the light control module sends requests to the switch in the form of a transmitted data packet (i.e. a Bluetooth packet including a CTE). The switch receives the request, and backscatters using the CTE part of the received signal as described above. This can be done for each received packet, or only after recognising an address sequence associated with the transmitting light control module. The backscattered signal is in a form readable by the light control module and includes the required information regarding the present intensity of ambient light and the current position of the switch. The light control module can adjust the light source to dim or brighten this depending on whether its current level (as determined by the position of the switch) is judged suitable based on the ambient light level. This provides for energy savings in this type of lighting system. Any of the features described above which characterize different parts of the backscatter system can be included in a lighting system of this type.

In another example, the backscatter-enabled device may comprise a remote control for a second electronic device, such as a television. The electronic device is set up to send and receive signals, usually in the radio wavelength range (possibly configured for Bluetooth communication). When the electronic device is switched on, it can be configured to send advertising packets or other data packets regularly to the remote control and other devices nearby and can receive similar signals back as a result of the backscatter capability of the remote control. The remote control can use these signals from the electronic device as described above by modulating a constant tone portion of a CTE to send data from the remote control, representing commands, in response to receipt of a data packet. The remote control can be configured to send the data via backscatter only when a button is pressed by a user indicating a that a command is to be sent, and the backscattered data can represent that command.

The invention claimed is:

1. A backscatter enabled device comprising:
    a receiver for receiving a signal in a first frequency channel including a data payload modulated onto a carrier and a constant tone extension at least part of which comprises a constant tone;
    energy detection means for detecting energy in the signal and initiating wait logic when, following an initial detection of energy, no energy is detected during a time period;
    wherein the wait logic is configured to wait for a trigger indicating that the constant tone is being received and send a start signal at the trigger;
    signal modulation means for receiving the start signal and, in response, modulating the constant tone based on data to be sent to produce a backscatter signal; and
    a transmitter for transmitting the backscatter signal.

2. The backscatter enabled device according to claim 1, wherein the modulated signal is transmitted in the first frequency channel.

3. The backscatter enabled device of claim 1, wherein the trigger is the subsequent detection of energy in the signal by the energy detection means.

4. The backscatter enabled device of claim 1, wherein the trigger is the subsequent detection of a specific pattern in the signal by the energy detection means.

5. The backscatter enabled device of claim 4, wherein the specific pattern is a constant power in the signal having a duration longer than one bit-period.

6. The backscatter enabled device of claim 4, wherein the specific pattern is an address sequence included at the start of the constant tone extension immediately preceding the constant tone.

7. The backscatter enabled device of claim 6, wherein the address sequence comprises a sequence of periods of power in the signal and periods of no power in the signal.

8. The backscatter enabled device of claim 6, wherein the backscatter device is configured to read the address sequence and either terminate the process or modulate the constant tone based on the data to be sent in dependence on the address sequence read.

9. The backscatter enabled device of claim 1, wherein the trigger is the passage of a predetermined time interval since the wait logic was initiated.

10. The backscatter enabled device of claim 1, wherein the energy detection means is a power detector having an input and at least two outputs indicating power in the incoming signal and no power in the incoming signal respectively.

11. The backscatter device of claim 1, configured to switch the energy detection means into sleep mode after the initial detection of energy and to switch it on again a predetermined length of time later.

12. The backscatter device of claim 11, wherein the predetermined time is less than the estimated time between the start of the packet and the start of a guard interval preceding the constant tone extension during which there is no power in the signal.

13. A method for operating a backscatter enabled device comprising:
    receiving a signal in a first frequency channel including a data payload modulated onto a carrier and a constant tone extension at least part of which comprises a constant tone;

parsing the signal and initiating wait logic when, following an initial detection of energy, no energy is detected during a time period;

waiting, by the wait logic, for a trigger indicating that the constant tone is being parsed and sending a start signal at the trigger;

receiving, by signal modulation means, the start signal and, in response, modulating the constant tone based on data to be sent; and transmitting the modulated signal.

14. A transmitting device for use in a communication system comprising at least one backscatter enabled device and a receiving device, the transmitting device being configured to:

modify a data packet such that it comprises a data payload modulated onto a carrier preceding a constant tone extension at least part of which comprises a constant tone, and such that the data packet includes instructions to the receiving device to exit synchronised mode and to prepare for re-synchronisation after receipt of the payload and prior to the start of the constant tone extension.

15. The transmitting device of claim 14, configured to modify the data packet to include an address sequence at the start of the constant tone extension, preceding the constant tone portion.

16. The transmitting device of claim 15, wherein the address sequence comprises a series of bits, wherein a time interval with power in the signal represents one bit value and a time interval with no power in the signal represents a second bit value.

17. The transmitting device of claim 14, configured to modify the data packet to include a guard interval during which no signal is sent immediately prior to the constant tone extension.

18. A communication system comprising:

the backscatter enabled device of claim 1; and a second device comprising a transmitting device for transmitting the signal towards the backscatter device.

* * * * *